United States Patent

[11] 3,632,434

[72] Inventor Jerald L. Hutson
P.O. Box 34235, Dallas, Tex. 75234

[21] Appl. No. 792,590

[22] Filed Jan. 21, 1969

[45] Patented Jan. 4, 1972

[54] PROCESS FOR GLASS PASSIVATING SILICON SEMICONDUCTOR JUNCTIONS
8 Claims, 8 Drawing Figs.

[52] U.S. Cl. .......... 117/212, 117/101, 117/119

[51] Int. Cl. .......... B44d 1/18, H01l 1/10

[50] Field of Search .......... 317/234 (46), 234 (31); 117/212, 101, 215, 119

[56] References Cited

UNITED STATES PATENTS

| | | | |
|---|---|---|---|
| 3,505,106 | 4/1970 | Pliskin et al. | 117/101 |
| 3,474,718 | 10/1969 | Guthrie et al. | 117/212 X |
| 3,300,339 | 1/1967 | Perri et al. | 117/212 X |

*Primary Examiner*—Alfred L. Leavitt
*Assistant Examiner*—Alan Grimaldi
*Attorney*—Kanz, Glaser & Harwood

ABSTRACT: A process for glass passivating silicon semiconductor junctions comprises the steps of coating a slice of semiconductor material containing exposed rectifying junctions in a liquid mixture of powdered glass and an organic component, spinning the slice to remove excess mixture, but leave remaining on the slice a thin uniform film of the mixture, heating the slice in an oxygen atmosphere to form a very thin silicon dioxide layer on the surface of the slice while burning off the organic component to leave the glass in a highly compacted, dry powder form tightly adhering to the slice, and again heating the slice in a dry, substantially oxygen-free atmosphere at a temperature sufficient to fuse the glass powder together and to the slice.

INVENTOR
JEARLD L. HUTSON

Kanz, Glaser & Harwood
ATTORNEYS

INVENTOR
JEARLD L. HUTSON

Kanz, Glaser & Harwood
ATTORNEYS

PROCESS FOR GLASS PASSIVATING SILICON SEMICONDUCTOR JUNCTIONS

It is well known in the semiconductor industry that semiconductor devices will deteriorate and become degraded as to their characteristics if the active junctions exposed at the surface of the device are not protected. The reasons for the deterioration and degradation of the junctions of the device is also well known and will not be discussed here. To minimize or eliminate this problem, considerable work has been done in an attempt to develop an economical means and/or process for passivating the junctions of semiconductor devices. In particular, considerable effort has been devoted to developing glass passivation techniques, whereby glass is fused to the surface of the semiconductor device at which the active junction intersects. Moreover, some degree of success has been obtained in glass passivation techniques, especially with respect to small signal semiconductor devices such as transistors, for example.

Two of the predominant problems existing in glass-passivating techniques today are the high degree of purity of the glass that must be employed to prevent contamination of the junction and degradation by the glass itself, and the difference between the respective thermal coefficients of expansion of the semiconductor device wafer and the glass fused to the surface. It will readily be seen that the first problem, namely high-purity glass, becomes an economical consideration because of the cost of the glass and elaborate and costly procedures that must be employed during the process of applying the glass to the semiconductor device to prevent contamination. The second problem manifests itself more predominantly in larger-sized devices, such as power devices, for example, since the larger the area of the device, the more thermal stresses and strains that are developed during operation of the device when the device heats up. Unless the differences in the thermal coefficients of expansion are taken into account, the glass coating often cracks and permits exposure of the junction.

The process of this invention eliminates both of the above-described problems, in that the requirement for high-purity glass is eliminated in addition to providing a highly compacted coating of fused glass on the semiconductor slice that is under strain so that expansion of the semiconductor slice upon heating does not cause appreciable stresses or strains in the glass coating. Briefly, the steps of this process comprise the coating of a silicon semiconductor slice in a liquid mixture of an inorganic component containing the glass in the form of finely ground powder. The slice is then spun to remove the excess of the mixture to leave remaining on the slice a thin uniform coating of the mixture. The organic component is employed as a carrier or vehicle for applying the glass to the surface of the semiconductor wafer as a film. Thereafter, the slice is heated for a controlled time and at a controlled temperature in an oxygen atmosphere to burn off the organic component and leave the glass in a highly compacted powder form adhering to the semiconductor slice. Although this particular time and temperature can be varied within certain ranges, the combination of the two are such that the organic component is burned off at a controlled rate so that the glass is compacted tightly to adhere to the semiconductor wafer. The temperature is insufficient, however, to fuse the glass at this stage of the process. At the same time that the organic component is burned off, a very thin layer of silicon dioxide is formed in the surface of the semiconductor wafer. Thus the oxygen atmosphere in this step is necessary not only to oxidize the organic compound to burn it off, but also to oxidize the surface of the silicon wafer to form the silicon dioxide layer. This silicon dioxide layer separates the compacted glass powder and the surface of the semiconductor wafer, including the exposed junction.

The preceding three steps, viz coating the slice with the mixture, spinning the slice and heating the slice can be repeated as many times as necessary to build up the desired thickness of glass powder on the surface of a wafer. Once the desired quantity of glass is compacted tightly on the wafer, the slice is heated in a dry, substantially oxygen-free atmosphere at a temperature sufficient to fuse the glass together and also fuse the glass to the semiconductor wafer. Thereafter, the glass can be etched away wherever desired in order to provide contacts or electrodes to the semiconductor device.

Glass, which is impure as compared to the semiconductor materials, is employed in this process. The silicon dioxide layer formed between the wafer and the glass coating permits the use of impure glass and prevents the impurities from reaching the junction. Therefore, the cost of very pure glass is obviated and many steps are eliminated that would normally be required to maintain high-purity conditions. Because of the manner in which the organic vehicle is burned off, the glass is left in a highly compacted state tightly adhering to the semiconductor wafer. When the glass is eventually fused to the semiconductor wafer, and thereafter cooled, the glass is in a strained state so that expansion of the semiconductor wafer does not generate appreciable strains or stresses in the glass, thus eliminating breaking of the glass.

Many other objects, features and advantages of the process of this invention will become readily apparent when taken in conjunction with the appended claims and the attached drawing wherein like reference numerals refer to like parts throughout the several figures, and in which:

Figure 2:
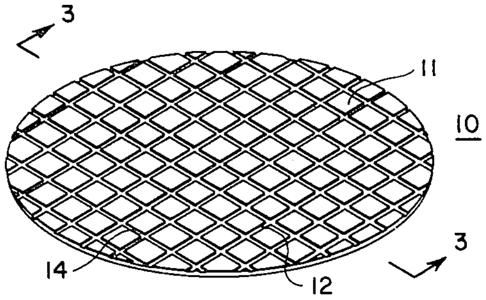
FIG. 2 is a perspective view of a typical silicon wafer containing many individual semiconductor devices in which the junctions have already been diffused.
Figure 3A:
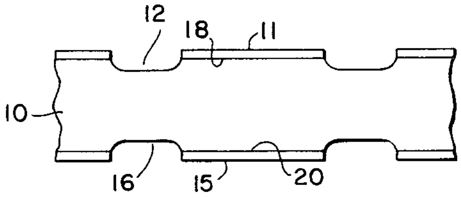
Figure 3B:
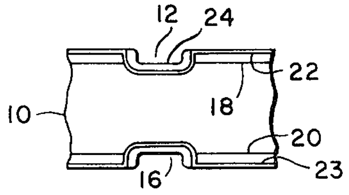
Figure 3C:
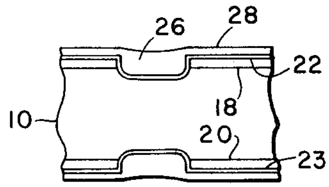
Figure 3D:
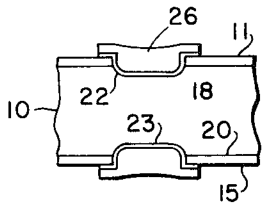
Figure 3E:
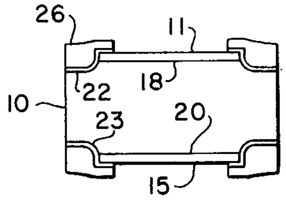
Figure 4:
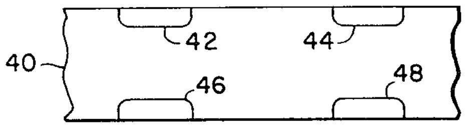

FIGS. 3*a*–3*e* are fragmentary, elevational views in section, taken across section lines 3—3 of FIG. 2, illustrating various conditions of the wafer after various steps of the process have been completed; and FIG. 4 is an elevational view, in section, of a semiconductor wafer containing planar-diffused devices as contrasted to mesa constructions.

Figure 1:
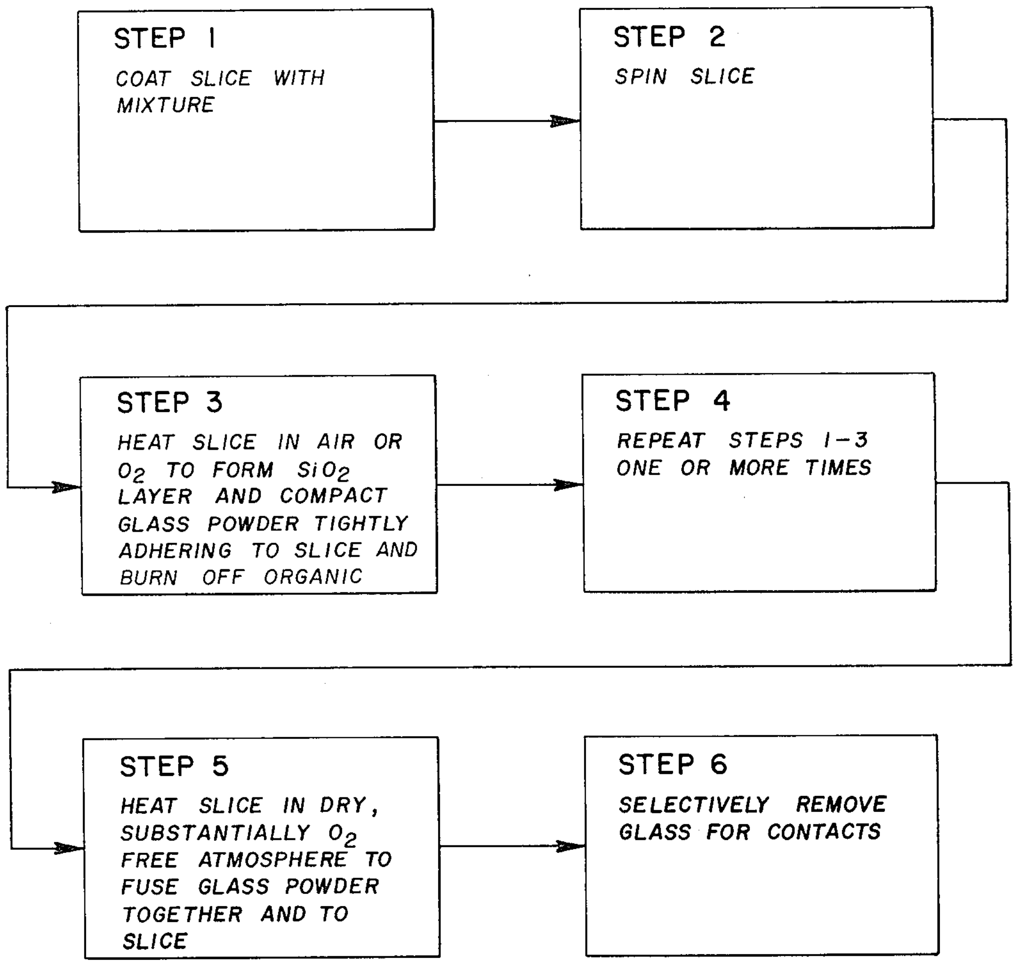
FIG. 1 is a flow diagram of the steps of the process.

The steps of the process as set forth earlier are shown in the flow diagram of FIG. 1. Accordingly, reference will be had throughout the following description to the flow diagram as the process is discussed with reference to FIGS. 2 and 3.

A mixture of powdered glass and a liquid organic component is prepared for coating the semiconductor wafer. Any suitable film-forming liquid organic compound or mixture can be employed as the carrier or vehicle for containing the glass powder. It has been found that KMER, manufactured by the Kodak Company, diluted with KMER thinner is suitable for this purpose. Powdered glass comprising approximately 50 percent lead oxide, 40 percent silicon dioxide and 10 percent aluminum oxide is then mixed into the organic vehicle for coating the silicon slice. This produces a viscous mixture or slurry that has a consistency similar to cream.

The components from which the glass is comprised, namely lead oxide, silicon dioxide and aluminum oxide, can be purchased from any suitable source in only moderate purity forms. By moderate purity forms are meant components that are only about 99 percent to 100 percent pure. Such materials will typically have impurities constituting a total of less than 1 percent, wherein the impurities are usually copper, iron, sodium, calcium, boron, manganese and various other elements. It will be emphasized that this degree of purity is considered to be very impure insofar as semiconductor technology is concerned and that which is required to dope or contaminate a typically pure semiconductor material. Moreover, this particular glass composition is one in which the expansivity is similar to silicon, but it should be emphasized that other suitable glass compositions can be employed.

To prepare the glass, the components are mixed in the proper weight ratios, for example 50–40–10 as noted above, and heated to a temperature in a suitable container or crucible sufficient to melt all of the components. Thereafter, the glass is solidified and cooled and ground to the desired fineness to form a powder. It has been found desirable to grind the glass to a fineness such that the powder will pass through a number 300 screen, which is a particle size of around 50 microns. It will also be understood that other glass particle sizes can be employed, although generally speaking, finer ground powders are preferred. The powder is then mixed with the KMER and KMER thinner to form a viscous mixture for coating the semiconductor wafer. A suitable mixture comprises approximately 500 cc. of KMER, 100 cc. of KMER thinner and 500 grams of the powdered glass.

A silicon semiconductor wafer is then dipped into the mixture as the first step of the process, whereby a perspective view of a typical semiconductor wafer 10 is shown in FIG. 2. A semiconductor wafer comprises a thin disc having a typical diameter of from about 1.0 to 2.5 inches, into which impurities have been diffused to form the various junctions of devices to be manufactured from the wafer. All of this is well known in the semiconductor technology and will not be further discussed here. It will be assumed for the present discussion that the various devices to be made from the wafer will be of a mesa construction, also well known, although a planar construction can also be employed. To form the mesa structures, the semiconductor wafer 10 is selectively etched to form a first set of parallel and spaced-apart grooves 12 running across the slice and a second set of spaced-apart and parallel grooves 14 running across the slice perpendicular to the first set of grooves. A fragmentary, side elevational view in section taken across section lines 3—3 of FIG. 2 is shown in FIG. 3*a*. This illustrates the semiconductor wafer 10 having impurities diffused into opposite sides thereof to form rectifying junctions 18 and 20 beneath the surface of the wafer. It will be understood that reference is not had to any particular semiconductor device, but that junctions 18 and 20 are shown only to illustrate the glass passivation of these junctions, and that this process is applicable to any semiconductor device with any number or configuration of junctions. The grooves 12 are etched across the slice to cut through junction 18 on the top surface of the wafer so as to isolate various devices within the wafer and to terminate the junction at a surface on which the junction can be passivated. As to the latter, it is difficult, if not impracticable, to protect a junction that terminates at the edge of a very thin wafer. In some cases, these mesas are also cut to expose an inner region below the junction so that a contact can be made to the inner region. Corresponding grooves 16 are etched across the slice on the bottom of the wafer to isolate the wafer into various devices and cut through junction 20. Again, all of this technology is well known. This leaves the wafer in the form of a plurality of mesa structures on the top of the wafer having lands or top surfaces 11, and a corresponding plurality of mesa structures in the bottom surface of the wafer having lands or top surfaces 15.

The wafer having the structure shown in FIGS. 2 and 3*a* is dipped into the mixture to completely coat the wafer with the mixture. Then, the wafer is spun to remove the excess of the mixture, but to leave a thin uniform coating of the mixture on the wafer. Although the wafer can be spun at different speeds and for different lengths of time, it is desirable to establish fixed parameters in this respect so as to provide a highly reproducible process. Excellent results have been obtained by spinning the wafer about an axis perpendicular to the wafer and running through the center thereof at a speed of approximately 500 r.p.m. for approximately 6 seconds. It will be pointed out here that other techniques, other than spinning, can be employed to remove the excess of the mixture, and that various film thickness left on the slice are operable in this method.

Since it is only necessary to cover the rectifying junctions 18 and 20 where they are exposed in the grooves, the mixture is preferably removed from the lands or surfaces 11 and 15 by using a blade scraped across the top and bottom surfaces of the wafer. Alternatively, this mixture or glass can be removed from these areas at a later step using an etching process.

The wafer is now heated in an oxygen atmosphere to accomplish three results, namely to oxidize and burn off the organic carrier or component, to form a very thin silicon dioxide layer in the surface of the semiconductor wafer and to highly compact the glass in a powder form tightly adhering to the semiconductor wafer. To effect this, the wafer is processed through the furnace on a conveyor belt in an oxygen atmosphere (air, for example) at approximately 700° C. for about 10 minutes duration. The condition of the wafer and glass coating after being passed through the furnace is shown in FIG. 3*b*, in which very thin silicon dioxide layers 22 and 23 are formed in the entire top and bottom surfaces, respectively, of the slice. These very thin layers are formed as a result of the elevated temperature and the presence of oxygen, and are in the order of a few angstrom units thick. It will be recalled in this particular example that the glass mixture was removed from the top surface of lands 11 and 15 of the wafer, but was left in the grooves. At the same time that the silicon dioxide layers are formed, the organic component is oxidized and burned off at a controlled rate so that the glass powder is left in a highly compacted form to produce a layer 24 of glass powder tightly adhering to the surface of the groove 12. Burning off the organic component at too rapid a rate (too high a temperature) causes bubbling and produces a glass powder on the surface of the semiconductor wafer that is spongy and loosely packed. One of the advantages of this process is the high density of the glass powder adhering to the semiconductor junction, so that when it is fused, it is virtually impenetrable by moisture or impurities. It will be emphasized that the glass is not fused during this process step as the temperature is below the fusion point of the glass. The structure that results after this step, as shown in FIG. 3*b*, is a semiconductor wafer with highly compacted glass powder tightly adhering to the surface of the groove at which the junctions are exposed, but in which the glass powder layer is separated from the junction itself by the very thin silicon dioxide layer 22.

The very thin silicon dioxide layer is very important in that the layer acts as a barrier against other impurities contaminating the junction. Without the glass, however, the silicon dioxide layer is insufficient in and of itself to act as a permanent passivation means since it can be eroded, dissolved, damaged or otherwise destroyed. However, it does apparently act as a barrier against the penetration of the junction by the impurities contained within the glass.

Steps 1–3, as shown in FIG. 1, can be repeated as many times as necessary to build up the desired thickness and quantity of glass within the groove 12, or over the junctions. It has been found that by repeating these steps three times provides an adequate coating of glass on the junction. On the last repeat, the glass is normally not removed from the lands 11 and 15, since the wafer will be selectively etched at a later step for the purposes of applying contacts or electrodes to the device. The resulting structure, after repeating these steps, is shown in FIG. 3*c* in which there still exist the silicon dioxide layers 22 and 23, with the grooves being substantially filled by highly compacted glass powder 26 adhering to the semiconductor wafer. A thinner layer of glass 28 is adherent to the lands 11 and 15, since this was not removed in the last step.

The wafer is then heated in a furnace at a higher temperature to fuse the glass together and to the semiconductor wafer. It has been found suitable to heat the wafer to approximately 925° C. for a time of approximately 2 minutes in an inert atmosphere, such as nitrogen, or an atmosphere that is dry and substantially oxygen-free. Preferably, this temperature is just sufficient to cause the glass to fuse. During this step of the process, the impurities contained within the glass are much more mobile, since the glass is at the fusion temperature. Therefore, greater danger exists for these impurities to penetrate through the very thin silicon dioxide layer and contaminate the junction. It has been found that any appreciable quantity of oxygen in the atmosphere within which the wafer is heated causes the junction to become degraded. It is thought the reason for this is that boron or other impurities combine with the oxygen to form a compound that acts as a flux which dissolves the silicon dioxide layer. Therefore, as short a time of heating while still effecting fusion of the glass, is desirable, although this time can be varied. After heating to fuse the glass, the wafer is removed from the furnace without slow cooling and allowed to immediately cool in air at ambient temperature. Thereafter, any desired portion of the glass can be removed from the lands 11 and 15 to expose the semiconductor surface for purposes of applying contacts to the device, such as is shown in FIG. 3*d*. Then, the wafer is scored along lines within the grooves and broken into individual devices as shown in FIG. 3*e*.

This process is equally applicable to any silicon semiconductor wafer having junctions exposed at surfaces. The foregoing description had reference to mesa-constructed devices within a wafer, but the process is equally applicable to planar constructions.

A fragmentary, elevational view in section of a silicon wafer having junctions diffused therein in planar constructions is drawn in FIG. 4. Here, the junctions 42, 44, 46 and 48, for example, within the wafer 40 are brought to the upper and lower surfaces by using suitable masking techniques during the diffusion process, all as is well known. To passivate these junctions at the surfaces, the same process is used as above described, but none of the mixture is removed after the wafer has been spun and before heating as may be done with mesa structures.

The process of this invention has been described above with reference to a particular example, although it will be understood that certain modifications and substitutions that do not depart from the scope of the invention will become apparent to those skilled in the art. Therefore, it is intended that this invention be limited only as defined in the appended claims.

What is claimed is:

1. A method of applying a glass composition to a silicon semiconductor wafer having junctions exposed at the surface of the wafer to passivate the junctions, comprising the steps of:

a. coating said exposed junctions at the surface of said wafer with a film of a mixture comprising said glass composition in the form of a powder contained within a liquid organic component.

b. heating said wafer at a temperature below the fusion temperature of said glass composition in an oxygen-containing atmosphere to form a silicon dioxide layer in the surface of said wafer at said exposed junctions and to simultaneously burn off and remove said organic component from said mixture to leave said glass composition in the form of a compacted powder adhering to said silicon dioxide layer, and c. thereafter heating said wafer in a dry, substantially oxygen-free atmosphere at a temperature sufficient to fuse said glass composition together and to said wafer.

2. A method as set forth in claim 1 including the step of spinning said wafer after being coated with said mixture to remove the excess of said mixture and to leave remaining on said wafer said film.

3. A method as set forth in claim 1 wherein said glass composition comprises approximately 50 percent by weight lead oxide, approximately 40 percent by weight silicon dioxide and approximately 10 percent by weight aluminum oxide.

4. A method as set forth in claim 1 whereby said wafer is heated in said oxygen-containing atmosphere at a temperature of about 700° C. for about 10 minutes, and is heated in said substantially oxygen-free atmosphere at a temperature of about 925° C. from about 2–3 minutes.

5. A method as set forth in claim 1 wherein said wafer is cooled at ambient temperature immediately upon fusion of said glass composition.

6. A method as set forth in claim 1 wherein steps (a) and (b) are repeated a plurality of times prior to heating said wafer to fuse said glass composition.

7. A method as set forth in claim 2 wherein said wafer is spun about an axis perpendicular thereto passing through the center of said wafer.

8. A method as set forth in claim 1 wherein said powder comprises glass particles of diameter of about 50 microns or less.

* * * * *